US007500912B2

(12) United States Patent
Owen

(10) Patent No.: US 7,500,912 B2
(45) **Date of Patent: *Mar. 10, 2009**

(54) VIDEO POKER SYSTEM AND METHOD WITH MULTIPLE CONCURRENT STARTING HANDS

(75) Inventor: Clint Alan Owen, Rockdale, TX (US)

(73) Assignee: Multimedia Games, Inc., Austin, TX (US)

( * ) Notice: Subject to any disclaimer, the term of this patent is extended or adjusted under 35 U.S.C. 154(b) by 612 days.

This patent is subject to a terminal disclaimer.

(21) Appl. No.: 11/100,278

(22) Filed: Apr. 6, 2005

(65) Prior Publication Data

US 2006/0229123 A1 Oct. 12, 2006

(51) Int. Cl.
*G06F 17/00* (2006.01)
*G06F 19/00* (2006.01)

(52) U.S. Cl. ............................ 463/13; 463/11; 463/12; 463/16; 463/25; 463/42; 273/138.1; 273/292

(58) Field of Classification Search .................. 463/13, 463/11, 16, 25, 42; 273/138.1, 292
See application file for complete search history.

(56) References Cited

U.S. PATENT DOCUMENTS 5,382,025 A * 1/1995 Sklansky et al. ............ 273/292
5,486,005 A * 1/1996 Neal .......................... 273/292
5,573,249 A * 11/1996 Johnson ...................... 273/292
5,816,915 A * 10/1998 Kadlic ......................... 463/13
5,816,916 A 10/1998 Moody
5,823,873 A 10/1998 Moody
5,868,618 A 2/1999 Netley et al.
6,007,066 A 12/1999 Moody
6,098,985 A 8/2000 Moody
6,132,311 A * 10/2000 Williams ..................... 463/13
6,146,271 A * 11/2000 Kadlic ......................... 463/13
6,322,445 B1 11/2001 Miller
6,358,151 B1 * 3/2002 Enzminger et al. ............ 463/43

(Continued)

OTHER PUBLICATIONS

"How to Play Casino Poker—Texas Hold'em" by Victor Royer. <URL:http://www.vegas.com/vegascom/betbasc/holdem>. [retrieved Jul. 11, 1996] [online] [2 pages].*

(Continued)

*Primary Examiner*—Scott Jones
*Assistant Examiner*—Milap Shah
(74) *Attorney, Agent, or Firm*—Nathan H. Calvert; The Culbertson Group, P.C.

(57) ABSTRACT

A method involves a video poker game in which a first set of card representations is displayed at a player station display device. The first set of card representations is organized into a number of card representation subsets comprising at least one card representation in each subset. After the player selects one of the subsets, a second set of card representations is displayed at the player station display device to combine with the selected subset. The combination is used to produce an optimum card hand that represents the player's result for the game. The player's result may be determined based on the combination of cards or may be predetermined from a lottery-type game, bingo-type game, or a result generator. In the latter cases the card representations displayed in the game are controlled so as to be consistent with the result identified for the player.

12 Claims, 3 Drawing Sheets

U.S. PATENT DOCUMENTS

| | | | | |
|---|---|---|---|---|
| 6,398,645 | B1 * | 6/2002 | Yoseloff | 463/19 |
| 6,435,500 | B2 * | 8/2002 | Gumina | 273/139 |
| 6,443,456 | B1 | 9/2002 | Gajor | |
| 6,474,645 | B2 | 11/2002 | Tarantino | |
| 6,511,068 | B1 * | 1/2003 | Sklansky et al. | 273/237 |
| 6,517,074 | B1 * | 2/2003 | Moody et al. | 273/292 |
| 6,568,680 | B1 * | 5/2003 | Moody et al. | 273/292 |
| 6,572,470 | B1 * | 6/2003 | Famularo | 463/13 |
| 6,585,590 | B2 * | 7/2003 | Malone | 463/19 |
| 6,695,695 | B2 * | 2/2004 | Angel | 463/13 |
| 6,726,427 | B2 * | 4/2004 | Jarvis et al. | 273/292 |
| 6,733,385 | B1 | 5/2004 | Enzminger et al. | |
| 6,749,500 | B1 * | 6/2004 | Nelson et al. | 463/13 |
| 6,802,776 | B2 * | 10/2004 | Lind et al. | 463/19 |
| 6,866,584 | B2 * | 3/2005 | Michaelson | 463/21 |
| 6,913,531 | B1 * | 7/2005 | Yoseloff | 463/13 |
| 7,044,468 | B2 * | 5/2006 | Sklansky et al. | 273/292 |
| 7,396,015 | B2 * | 7/2008 | Feola | 273/292 |
| 2002/0074725 | A1 * | 6/2002 | Stern | 273/274 |
| 2002/0132661 | A1 | 9/2002 | Lind et al. | |
| 2002/0132666 | A1 | 9/2002 | Lind et al. | |
| 2003/0090063 | A1 | 5/2003 | Jarvis et al. | |
| 2003/0162424 | A1 * | 8/2003 | Berman | 439/131 |
| 2003/0189290 | A1 | 10/2003 | Moody | |
| 2004/0033824 | A1 * | 2/2004 | Fitzhugh | 463/13 |
| 2004/0106445 | A1 | 6/2004 | Perrie et al. | |
| 2004/0152499 | A1 | 8/2004 | Lind et al. | |
| 2004/0209664 | A1 | 10/2004 | Enzminger et al. | |
| 2006/0066051 | A1 * | 3/2006 | Nicely | 273/292 |
| 2006/0217167 | A1 * | 9/2006 | Jubinville et al. | 463/13 |

OTHER PUBLICATIONS

International Search Report for PCT/US2006/11290 dated Sep. 19, 2007 (2 Pages).

Written Opinion of the International Search Authority (PCT Rule 43bis. 1) for PCT/US2006/11290 dated Sep. 19, 2007 (5 Pages).

IGT—Hold 'Em Challenge TM Video Poker, http://www.igt.com/GamingGroup/game_detail.asp?toggle=ovr&pid=5.113.120&t (2 pages) (Dec. 2, 2004).

* cited by examiner

VIDEO POKER SYSTEM AND METHOD WITH MULTIPLE CONCURRENT STARTING HANDS

TECHNICAL FIELD OF THE INVENTION

This invention relates to video gaming systems. More particularly, the invention is directed to a video poker gaming apparatus, method, and program product that facilitates both player interaction in the course of game play and rapid play.

BACKGROUND OF THE INVENTION

Video poker gaming machines are designed to replicate the play of a poker game. These gaming machines commonly include a video display device together with a set of player controls through which a player may place bets and take various actions in the course of a game. The cards dealt to the player are displayed on the video display device as graphic card representations. The graphic representations of cards dealt in a video poker game will be referred to in this disclosure and the accompanying claims as "card representations." In some video poker games, the object of the game is to beat a dealer whose hand is simulated on the video display. In other video poker games, the player does not play against any competitor. In these types of video poker games, the object is to produce the best hand for the particular game, and prizes are awarded to the player based on the value of the hand without regard to the value of any other card hand produced by another player or simulated player. In these latter types of video poker games, prizes are awarded based on a paytable that correlates each possible card hand value to a respective prize level.

In view of the keen competition for players, different types of video poker games have proliferated over the last ten to twenty years. Gaming system providers continuously strive to provide new types of video poker games and interesting game graphics in order to capture and maintain player interest. One way to make games more interesting to players is to provide a high degree of player interaction in the course of a game. However, increased player interaction may be at odds with another goal of video gaming systems, to provide relatively rapid play.

SUMMARY OF THE INVENTION

The present invention provides an exciting and interactive video poker game. The invention encompasses gaming methods in which a player has a certain amount of control concerning the card representations that are included in the player's poker hand. In one form of the invention, a result is identified for the player, and a poker card hand consistent with that result is formed from a number of card representations that include one or more of the player selected card representations. Prizes are awarded according to a paytable that correlates each possible poker hand value to a respective prize level. For example, the poker hand values "three-of-a-kind," a "pair," and a "full house" are each correlated to a respective prize level.

One method according to principles of the present invention includes displaying a first set of card representations at a player station display device. The first set of card representations is organized into a number of card representation subsets comprising at least one card representation in each subset. The player is allowed to select one of the number of subsets using player controls at the player station. After the player selects the subset, a second set of card representations is displayed at the player station display device to combine with the selected subset. The card representations in the second set of card representations are chosen so that the optimum poker hand that may be produced from the selected subset of card representations and the second set of card representations is consistent with a result that has been identified for the player. The result may have been identified at any time prior to the display of the second set of card representations, and in some cases, before the display of the first set of card representations.

One preferred form of the invention includes displaying a separate hand value indicator on the display device to indicate the value of the hand produced from the player's selected subset and the second set of card representations. A hand value indicator may also be displayed on the display device for each other combination of card representation subset and second set of card representations. Thus, the player is not only advised of the value of his hand but also the apparent value of the hands produced by combining the card representation subsets that the player did not select and the second set of card representations.

The result for the player may be identified in a number of ways within the scope of the present invention. For example, a result may be identified from an electronic lottery ticket assigned to the player. A result for a player may also be produced from a result for the player in a bingo game. Results may also be randomly determined according to some algorithm. It is also possible that the result of a given play in the game may be determined by an actual evaluation of the subset of card representation selected by the player together with the second set of card representations that have been selected/dealt at random from a simulated deck of cards.

A gaming system according to principles of the present invention may include one, and preferably many, player stations each having a display device and a player control/input arrangement. A gaming system also preferably includes a distribution controller which identifies and distributes at least the first and a second set of card representations to a given player station. The first set of card representations is organized into a number of card representation subsets and displayed on the display device. In forms of the invention in which results are identified by an actual evaluation of the card representations dealt in game, a combination controller may be included in the system for combining the second set of card representations from the distribution controller with the player selected card representation subset of the first set of card representations to identify an optimum card hand for the player. A prize controller may also be provided for awarding/assigning a prize to the player correlating to the player's optimum card hand.

The present invention also includes a program product stored on at least one storage medium. The program product includes a set of machine-readable instructions that are executable to carry out the methods disclosed herein.

These and other advantages and features of the invention will be apparent from the following description of the preferred embodiments, considered along with the accompanying drawings.

DESCRIPTION OF PREFERRED EMBODIMENTS

Figure 1:
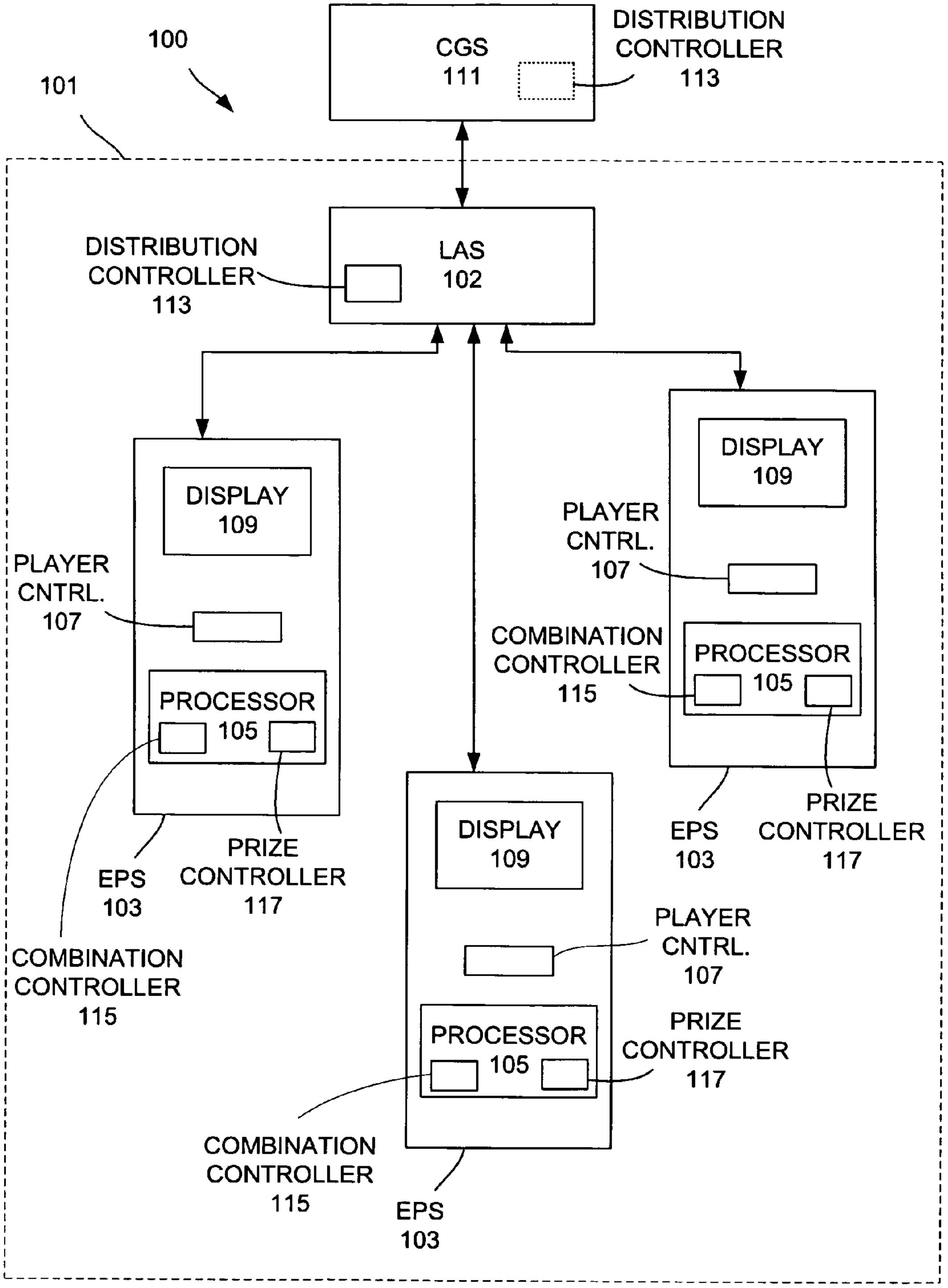
FIG. 1 is a high level diagrammatic representation of a gaming system in which the present invention may be implemented.

FIG. 1 shows an example gaming system 100 that enables a player to take part in a video poker game according to the present invention. Gaming system 100 includes one or more gaming sites/casinos 101. Each gaming site 101 may include a local area server (LAS) 102 and a number of electronic player stations (EPSs) 103. When multiple gaming sites 101 are included in the system 100, the system 100 may also include a central game server (CGS) 111 to allow system wide communications, data collection, and control between or among gaming sites 101.

Each EPS 103 shown in FIG. 1 includes a processor 105 and a user interface arrangement including a player control arrangement 107 and a display device 109. Although not shown separately in the drawing, processor 105 may be associated with nonvolatile memory, volatile memory, and a communications interface. The volatile and nonvolatile memory of EPS 103 may store computer program code that is executed by processor 105 to cause the processor to perform or direct the various functions provided by EPS. Player control arrangement 107 may include various configurations of buttons, switches, pointing devices, and other devices that allow a player to make inputs during the course of a poker game. Display device 109 includes at least one video monitor/display such as a CRT, LCD, plasma, or other display device for displaying graphics in the course of game play. In particular, display device 109 displays various playing card representations as will be described in detail below. It will also be noted that player control functions may be integrated with display device 109 by using a touch screen display device. In these arrangements, the display screen itself, or more specifically, the touch sensitive film applied over the display screen and the controller associated with the touch-sensitive film, comprises part of player control arrangement 107.

It will be appreciated that FIG. 1 provides only a very diagrammatic representation of each EPS 103 and does not show many elements that may be included in an EPS 103 that may be used in a gaming system according to the present invention. Further, the EPSs 103 need not be identical throughout the system 100. Rather, there may be wide variations in the various components included in each EPS 103. The system shown in FIG. 1 is limited generally to show just the elements necessary or helpful in describing the present invention. Further elements that may be included in an actual EPS are omitted from the drawings so as not to obscure the present invention in unnecessary detail.

Examples of additional components that may be included with an EPS 103 include a separate graphics processor for driving display device 109, a sound system for providing high quality audio output at the EPS 103, and a visual alerting device such as a light mounted at the top of the EPS. Also, those familiar with gaming machines will appreciate that each EPS 103 may include a device for receiving value and issuing value in the course of play. For example, an EPS 103 may include a device or arrangement of devices for accepting currency, vouchers, and/or tokens, and a device or arrangement of devices for dispensing currency, vouchers, and/or tokens as winnings. Of course, any appropriate device for receiving and issuing value in games played according to the present invention may be used, and the device may even be completely separate from the EPS 103. Alternatively or in addition to value in/out devices, EPSs 103 may obtain player account information and account for wagers and winnings in the manner set out in U.S. publication No. 2002-0132666, filed Jan. 10, 2002 and entitled "Distributed Account Based Gaming System." An EPS 103 in system 100 may include any suitable card reader for reading information from a player account or player account card and/or a suitable interface such as an actual keypad or touchscreen keypad that allows a player to input player account or player account identifying information.

Player account related databases and other databases that may be used in system 100 may be maintained at any suitable point in the system. In preferred implementations of system 100, the respective LAS 102 associated with a given gaming site maintains accounting and player databases for players using EPSs 103 at that particular gaming site. However, a more centralized component, such as CGS 111 may also participate in maintaining player account and player activity information.

The LAS 102 shown in FIG. 1 may include at least one computer system having one or more processors, nonvolatile memory, volatile memory, a user interface arrangement (for system administration), and a communications interface (not shown). The volatile and nonvolatile memory may store computer program code that may be executed by the processors to cause the processors to perform or direct the various functions provided by LAS 102. The specific functions of LAS 102 depend upon how results of the game are driven. For example, when results are driven by a bingo-type game, LAS 102 may serve primarily to transfer or relay information to or from its respective EPSs 103 so that bingo games may be conducted at a centralized system such as CGS 111. In other embodiments, for example when results of the game are driven by a lottery-type game, LAS 102 may store one or more pools of lottery records for use in satisfying game play requests originating from the LAS's respective EPSs 103.

LAS 102 may communicate with its respective EPSs 103 across a suitable communications network. Each EPS 103 may communicate with its LAS 102 across the network to provide status information such as information on any player that may be identified at an EPS 103, or other information concerning the EPS such as player inputs. For controlling the poker games and awarding different prizes in a game, LAS 102 may also include or interact with a distribution controller 113, a combination controller 115, and/or a prize controller 117.

The distribution controller 113 shown in FIG. 1 is implemented through one or more processing devices at LAS 102 and identifies card representations to be displayed to the player for a given play in the game. For example, distribution controller 113 may shuffle a deck of card representations prior to distributing the card representations to one or more players. By "shuffle" it is meant that the distribution controller 113 is programmed to randomize the order of the cards that are to be dealt to the player or players. The randomization may occur by randomizing a list of cards grouped into a file and distributing the card representations to a player sequentially from the file according to the randomized list. Alternatively, the card representations may be ordered in the file and randomly selected from the file for distribution to the player. Of course, other variations for the distribution of card representations are contemplated and would be apparent to those of ordinary skill in the art and viewing the present disclosure. In particular, as will be described in greater detail below with reference to FIG. 2, the card representations may also be identified based on a result of a bingo game or a lottery game or some other result unrelated to the random assignment of card representations.

The combination controller 115 shown in FIG. 1 is implemented through the processor 105 at each respective EPS 103. Each combination controller 115 operates under the control of program code to combine and evaluate different groups of the card representations that are distributed by distribution controller 113 to the respective EPS 103. It will be appreciated that the element in the present invention that combines and evaluates card hands according to the invention need not be implemented at the respective EPS 103. Rather, a combination controller within the scope of the present invention may be implemented at LAS 102 or at some other component in system 100. Furthermore, some implementations of the present invention may integrate the combination and evaluation function with the card representation distribution function performed by distribution controller 113. Other implementations may use predefined results and thus may not require the functions provided by combination controller 115. Thus, some preferred forms of the present invention may include no separate combination controller such as the controllers 115 shown in FIG. 1.

The prize controller 117 shown in FIG. 1 may be implemented through the respective EPS processor 105 or through a separate processing device to assign appropriate prizes in a video poker game according to the present invention. Regardless of where prize controller 117 is implemented in the system, the prize controller assigns prizes for a player's poker hand based on the value of the hand as dictated by a paytable correlating each possible poker hand value to a respective prize value. For example, a prize controller 117 shown in FIG. 1 may perform a paytable look up to find the prize associated with the poker hand identified by the combination controller 115. In other forms of the invention, especially forms in which results in the game are determined through a lottery-type game result, bingo-type game result, or a result from some other random result generator, prize assignment may also be integrated with the function of distribution controller 113. In these forms of the invention, there may be no separate prize assignment controller or controllers 117 as shown in FIG. 1. Regardless of the particular system element responsible for identifying the prize to be awarded to a player for a given play in the game, the prize may be awarded in the form of a credit applied to a player account, in the form of currency or a cash out ticket dispensed at the EPS 103, or in any other suitable form.

Gaming system 100 may use the CGS 111 or even the LAS 102 as a central processing system for various purposes. Specifically, either the LAS 102 or CGS 111 may hold data for implementing accounting or player tracking, and the CGS 111 may perform all of the functions that the LAS 102 may perform. For example, when the CGS 111 serves as the central processing system, the distribution controller 113 shown in dashed lines at the CGS 111 could directly communicate with the EPSs 103 or communicate through the respective LAS 102 to identify and distribute card representations to EPSs 103 at different gaming sites 101. Further, CGS 111 may be located at a site remote from the site of LAS 102 and EPSs 103. This provides a convenient arrangement for updating player information at a central location as players move from one casino/gaming site 101 to the next in gaming system 100.

Where the results used according to the present invention are identified from a bingo game, CGS 111 may serve as a component for conducting the bingo games and identifying bingo results. In particular, CGS 111 may serve a function similar to the element of the same name shown at reference numeral 101 in U.S. Patent Application Publication No. 2004-0152499-A1, published Aug. 5, 2004, and having the title "Method, System, and Program Product for Conducting Multiple Concurrent Bingo-Type Games," the entire content of which is incorporated herein by this reference. As will be noted in this incorporated publication, LAS 102 may also serve as the bingo game conducting component in some instances.

Where results are produced in a lottery-type game, CGS 111 and LAS 102 may cooperate to provide lottery results. For example, CGS 111 may also perform the functions provided by the game manufacturing computer system 11 in U.S. Pat. No. 6,733,385 B1, and LAS 102 may perform the function of central computer system 12 shown in that patent. The entire content of U.S. Pat. No. 6,733,385 B1 is incorporated herein by this reference.

Figure 2:
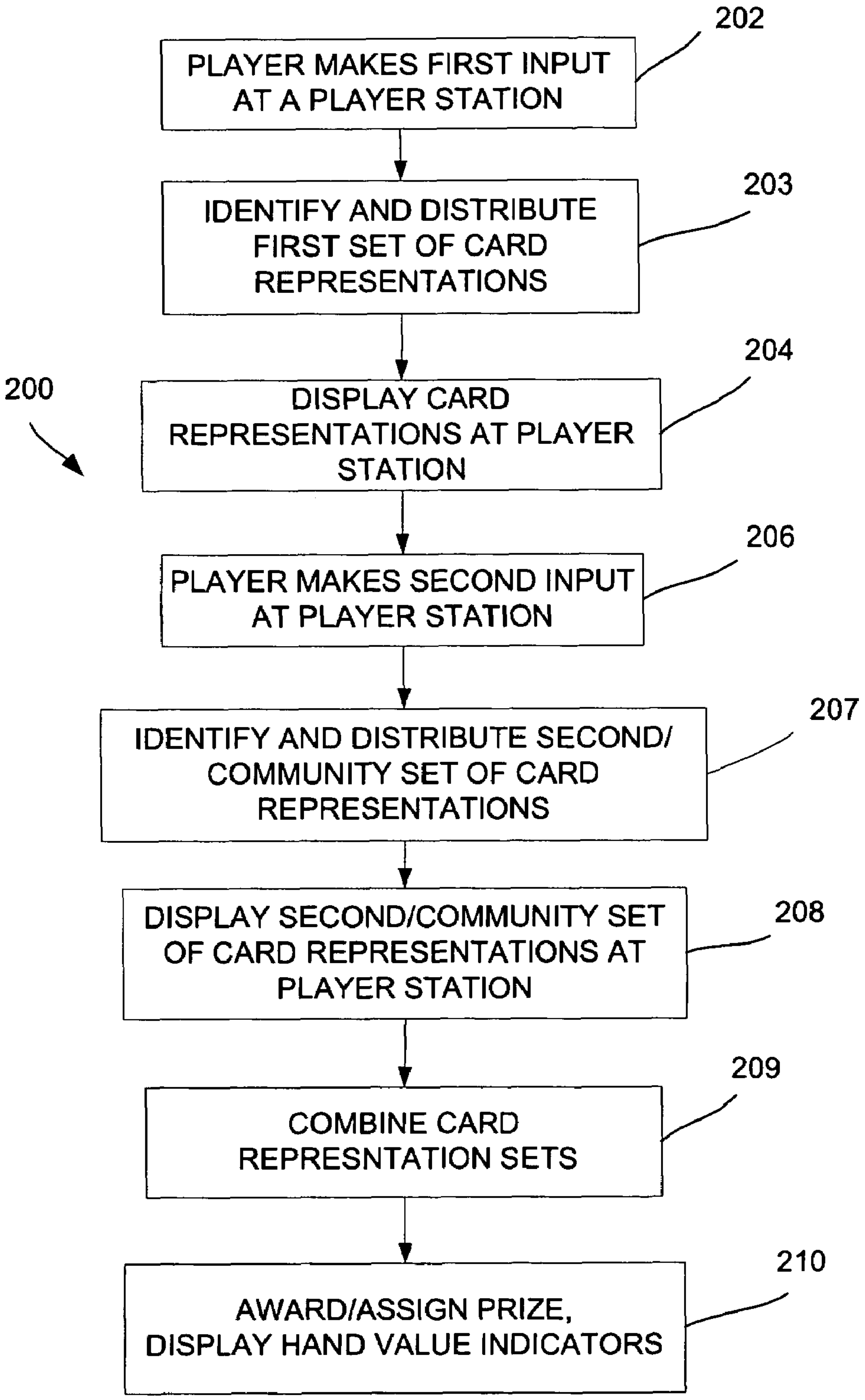
FIG. 2 is a flow diagram illustrating a gaming method embodying principles of the present invention.

FIG. 2 is a flow diagram illustrating a gaming method 200 embodying principles of the present invention. This process shown in FIG. 2 represents the process with respect to a single play in the game for a given player. As indicated at process block 202, a player makes a first input at a player station (such as an EPS 103 shown in FIG. 1) to enter a video poker game. At process block 203, a first set of card representations is identified and distributed to the player station, and at process block 204, the first set of card representations is displayed in subsets at the player station. As indicated at process block 206, the player makes a second input at the player station to select one of the subsets, and a second set of card representations are identified and distributed as shown at process block 207. The process includes displaying this second set of card representations at the player station as indicated at process block 208, and at process block 209, each of the different subsets of the first set of card representations is combined with the second set to identify an optimum hand value for each combination. Appropriate prizes are awarded as indicated at process block 210.

When gaming system 100 of FIG. 1 is used to implement the gaming method 200 of FIG. 2, a player may make the first input of process block 202 at a player station such as an EPS 103 shown in FIG. 1. For example, the player may make a first input by actuating a "deal" or "play" button or other control included in player control arrangement 107 shown in FIG. 1. This first input may also include the player making a bet or wager in some fashion through the EPS 103. It will be appreciated that the input to initiate the game may be separate from making the bet or wager. Thus, the first input may involve one or more separate actions or inputs at the EPS 103.

The step of identifying and distributing the first set of card representations as shown at process block 203 in FIG. 2 may be performed in a number of different fashions within the scope of the present invention. In one embodiment, distribution controller 113 of example gaming system 100 in FIG. 1 acts as a card dealer for the video poker game, selecting card representations at random from an electronically represented deck of card representations. Alternatively, in an embodiment in which game results are obtained from a lottery-type game, distribution controller 113 selects card representations for the first set of card representations based on one or more lottery results selected from one or more lottery record pools. In yet another embodiment, one in which results are obtained from a bingo-type game, distribution controller 113 selects card representations based on one or more bingo results. Various options within the scope of the invention to identifying and distributing the first set of card representations will be described further below in reference to the example displays shown in FIGS. 3 and 4.

It will be noted that the distribution of the first set of card representations as indicated at process block 203 is accomplished by communicating sufficient information/data to the respective EPS 103 to allow the EPS to display the desired card representations through the EPS display device 109. This information/data may take numerous different forms within the scope of the invention. For example, the data communicated to the EPS 103 for each card representation may comprise data actually defining the respective card representation including graphics instructions. Alternatively, the data communicated the EPS 103 for each card representation may comprise simply a code and the EPS includes programming to generate the necessary display commands from that code. Also, the data communicated to the EPS to “distribute” the first set of card representations may comprise a code from which the entire first set of card representations may be determined at the EPS for appropriate display. Also, it should again be noted that some forms of the invention may leave it to the EPS 103 to identify the specific card representations to be displayed in the first set of card representations and thus there may be not communication to the EPS 103 to distribute card representations. Rather, it may be only a result for the game that is distributed to the EPS 103.

The step of displaying the distributed first set of card representations shown at process block 204 may be performed using a suitable display device such as an EPS display device 109 shown in FIG. 1. The display for a given EPS 103 may be controlled through EPS processor 105 in FIG. 1 and/or a separate graphics processor that may be included with the EPS as described above. The card representations may be displayed in various fashions and formats within the scope of the invention. In every case, however, the card representations are separated into two or more subsets in some fashion to facilitate the player choice indicated at block 206 in FIG. 2. The player choice in some forms of the invention may even be to select certain card representations from the first set, thereby creating the subsets by the player choice. In the example described below with reference to FIG. 3, the first set of card representations is displayed in five different two-card subsets with each card displayed face up. Alternatively, the distributed card representations may be displayed face down. In embodiments in which each card subset includes multiple card representations, the card representation subsets may each be displayed having some card representations displayed face up and other card representations displayed face down.

The player input indicated at process block 206 in FIG. 2 is preferably entered through a suitable player input arrangement at the player's player station. In the example system in FIG. 1, the input may be entered though player control arrangement 107 or through a touchscreen implemented with display 109 and included in the player control arrangement. Regardless of the display method or the particular form of the player input, the input shown at process block 206 effectively selects a card representation subset from the first set of card representations displayed as indicated at process block 204. As will be described further below, the player's input/selection may or may not affect the player's result for the game regardless of whether results are determined randomly or from a lottery-type game or bingo-type game.

The step of identifying and distributing the second, “community” set of card representations indicated at block 207 in FIG. 2, may be performed by the card distribution controller 113 shown in FIG. 1. The manner in which the step is performed may vary significantly within the scope of the present invention as may the number of card representations included in the second set of such representations. In some forms of the invention, distribution controller 113 randomly selects electronically represented cards from a card deck under control of a suitable random selection program. In these forms of the invention, the result for the player is determined by a combination of the player's selection at block 206 and the second set of card representations randomly selected at block 207. In forms of the invention in which the player's result is obtained from a result in a lottery-type game or a bingo-type game, or in which the player's result is randomly determined in some fashion before the step at process block 207, the step of identifying and distributing the second, “community” card representation set at block 207 is performed so as to force the given result. These variations in the step performed at block 207 will be described further below after describing the example displays in FIGS. 3 and 4. It will be noted that the step of distributing card representations included in the second set of card representations may be performed in any of the ways described above in connection with the identifying and distributing step shown at process block 203.

The process of displaying the second set of card representations shown at process block 208 may be performed in the same fashion as described above with reference to the displaying step shown at process block 204. As with the displaying step 204, the displaying step at block 208 may include displaying the card representations in any of a number of different arrangements or formats. In the display shown in FIG. 4 for example, the second set of card representations is displayed with each represented card face up. The graphics may show the second set of cards being dealt one at a time, or the second set of card representations may appear on the display device suddenly. Other display arrangements may show the cards initially face down and the player may be required to make some input to cause the card representations to be shown face up, either all at the same time or individually one at a time. In any case, the card representations are preferably displayed at the EPS display device 109 in FIG. 1 under suitable control from EPS processor 105 and/or a separate graphics processor included at the player's EPS 103.

Where the step of combining the second set of card representations is performed separately as indicated at process block 209 in FIG. 2, the step may be preformed by the respective combination controller 115 included at the player's EPS 103 shown in FIG. 1. This combination step includes at least combining the player's selected subset of card representations selected at block 206 and the second set of card representations and evaluating the combination to identify the optimum, that is, highest valued card hand according to the given rules of the poker game. In some forms of the invention, the combination and evaluation may be performed for each separate subset of card representations that were available for the player to choose at block 206. In any case, the combination and evaluation may be performed by any suitable processing device under control of combination and evaluation software. For example, a processor may be programmed to compare the combined card representations sequentially against each of a number of card hand value definitions. The highest value match for a given combination represents the optimum value for that hand. Of course, in forms of the invention in which the result is known from a random result generator, lottery-type game, or bingo-type game, there may be no separate combination and evaluation step as indicated at block 209. That is, there are no combination and evaluation to identify the player's game result as shown at process block 209 in forms of the invention in which the result is already known. However, even when the player's result is known, the combination and evaluation step may be performed to identify an apparent result for each subset not selected by the player unless those results are also predetermined in some fashion.

The prize awarding step shown at process block 210 in FIG. 2 may comprise any process by which the prize for the player dictated by the result of the game play may be awarded to the player. For example, in the system shown in FIG. 1, the prize controller 117 associated with the player's EPS 103 may perform a look up in a result table/paytable that correlates a given game result to a prize in the game. However, in forms of the invention in which the result is taken from a random result generator, lottery-type game, or bingo-type game, the result may already be associated/correlated to a given prize. In these forms of the invention, the prize awarding step shown at block 210 in FIG. 2 may include merely assigning the identified prize to the player in accordance with the particular game accounting system employed in the given implementation. In any event, the step shown at process block 210 in FIG. 2 may include displaying a hand value indicator at least for the player's selection from block 206, and preferably for each subset of card representations that were available to the player for their selection at block 206. Specific examples of this hand value indicator will be described below with reference to FIG. 4.

Figure 3:
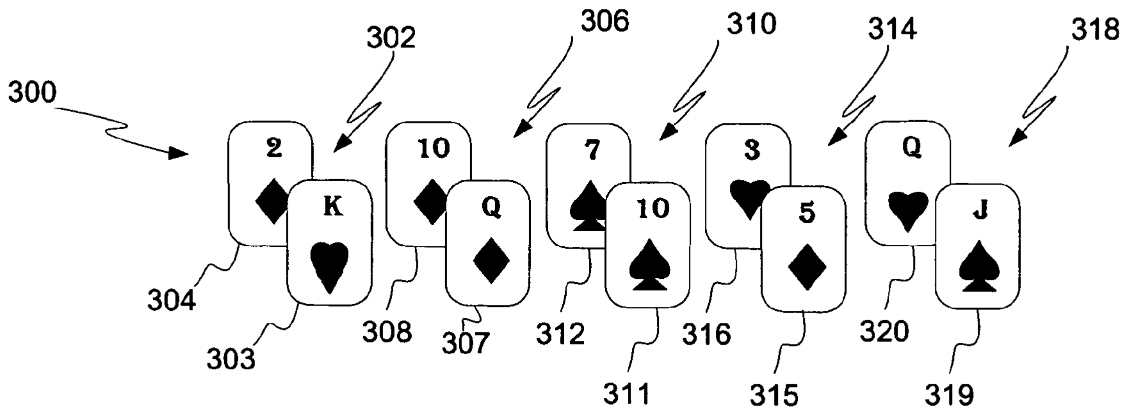
FIG. 3 is an illustration of the first set of card representations that may be displayed in response to a first input from a player at a player station of FIG. 1.

FIG. 3 shows a first set 300 of card representations that may be identified and distributed as indicated at process block 203 in FIG. 2 and then displayed as indicated at process block 204 in FIG. 2. The first set 300 of card representations includes ten different player card representations, each shown face up and divided into five subsets of two card representations each. In this example display that may be produced according to the invention, the first subset 302 is illustrated including card representation 303 comprising the king of hearts and card representation 304 comprising the two of diamonds. The second subset 306 is illustrated including card representation 307 comprising the queen of diamonds and card representation 308 comprising the ten of diamonds 308. The third subset 310 includes card representation 311 comprising the ten of spades and the card representation 312 comprising the seven of spades. The fourth subset 314 includes the card representation 315 comprising the five of diamonds and the card representation 316 comprising the three of hearts. The fifth and final subset 318 includes the card representation 319 comprising the jack of spades and the card representation 320 comprising the queen of hearts.

It should be noted that the illustration shown in FIG. 3 is simply an example that may be used to help describe the principles of the present invention, and is in no way to be considered limiting. Many variations in the display made according to process block 204 are possible within the scope of the present invention. For example, numerous other graphic representations may be used to show card faces, and the invention is not limited to the simple representations shown for purposes of example. Also, the invention is not limited to five different subsets for the first set of card representations, nor is the invention limited to subsets including two card representations. Other variations of the invention may include subsets containing two card representations, but with one face up and the other face down. All of the card representations in the first set 300 may initially be shown face down and one or more cards may be flipped in response to some player input, entered at the respective player's EPS, or in response to some other event. In any event, the display ultimately made as indicated at block 204 in FIG. 2 gives the player a choice between two or more options for their card hand. The five-choice arrangement shown in FIG. 3 is but one possibility within the scope of the present invention.

Figure 4:
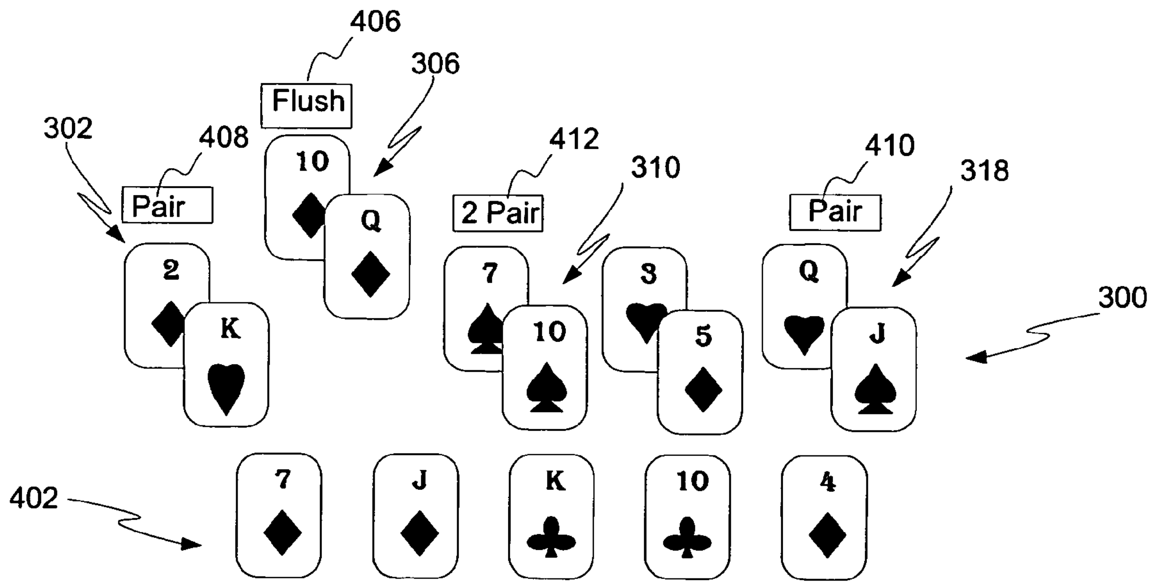
FIG. 4 is an illustration of a display that may be presented to the player in response to a second input from a player at a player station of FIG. 1, and showing the first set of card representations and the second set of card representations.

FIG. 4 is an illustration of a display that may be produced according to the invention in accordance with process block 208 in FIG. 2 as modified with any hand value indicators which may be displayed in accordance with process block 210. That is, the example graphic shown in FIG. 4 may be generated at an EPS display device 109 (FIG. 1) after the player's selection of one or more subsets from the first set 300 of card representations shown in FIG. 3. In this example graphic, the second set of card representations is indicated by reference numeral 402, and includes five additional card representations. The specific card representations in the example of FIG. 4 are the seven of diamonds, the jack of diamonds, the king of clubs, the ten of clubs, and the four of diamonds. The player's selected subset is indicated in FIG. 4 by raising the selected subset, the subset 306 in this example, relative to the unselected subsets. Of course numerous other graphic effects may be used to distinguish the player's selected subset of card representations from the unselected subsets or card representations.

According to the invention, the result of the game for the given player is determined or illustrated by combining the card representations from the second/community set 402 of card representations with the player-selected subset from the first set 300 of card representations, in this example, subset 306. In this example, the result is indicated by the optimum/highest five-card hand produced by the combination of card subset 306 and second card set 402, and corresponds to a "flush" made up of the queen, jack, ten, seven, and four of diamonds.

The graphic example shown in FIG. 4 also shows hand value indicators displayed proximate to each subset from the first set 300 of card representations which produces a hand having some value according to the rules of the particular poker game. Specifically, FIG. 4 shows hand value indicator 406 for the player's selected subset 306, hand value indicator 408 for subset 302, hand value indicator 412 for subset 310, and hand value indicator 410 for subset 318. The hand value indicator 406 for the player's selected subset allows the player to quickly ascertain the value of their hand, and the hand value indicators for the unselected subsets allow the player to quickly ascertain whether they appear to have made the best choice of card representation subset from the first set 300. Numerous different graphics may be used in addition to or in lieu of the simple hand value labels shown for purposes of example in FIG. 4.

Various options within the scope of the present invention for identifying and distributing card representations as indicated at block 203 and block 207 in FIG. 2, may now be described in terms of the concrete display example shown in FIGS. 3 and 4. In one form of the invention, the results may in fact be determined based on the card hand values produced by the card representations distributed in the second set (such as set 402 in FIG. 4), and on the player's selected subset (306 in FIGS. 3 and 4). In this form of the invention, each of the card representations in first set 300 and in second set 402 are in fact randomly selected by a suitable selection arrangement from an electronically represented card deck. Since the results are determined based on randomly selected card representations, the process must include a step of combining the cards from the second set 402 with the card representations in the player's selected subset 306 and any other subset for which a hand value is to be displayed in a hand value indicator. This combination and evaluation step is indicated at process block 209 in FIG. 2 and may comprise any means of evaluating the given combination of card representations to identify the highest valued hand that may be produced by the combination.

In forms of the invention in which a result is taken from a random result generator or from a lottery-type game or bingo-type game, the process of identifying cards at either block 203 or 207 may not be random depending upon the particular card game rules. In these cases, the card representations that are identified and ultimately displayed to the player must be displayed so that the graphic presentation is consistent with the result obtained for the player. For example, if a result has been determined in some fashion for the player and this result is to represent the player's result regardless of the player choice/selection made as indicated at block 206 in FIG. 2, then the card representations included in the subsets of the first set of card representations and the card representations included in the second/community set of card representations must be controlled to the extent necessary to produce a hand value consistent with the player's result. The following examples illustrate the necessary control. Assume that the player's result is a loss, that is, a hand of no value. In that case, the subsets formed from the first set of card representations must not include any combinations of value, such as a "pair" where the subsets are made up of two card representations. Also, in this case, the card representations identified for the second/community set of card representations must include no card combinations of value and must not produce any combinations of value when combined with the player's selected subset. Thus, the card representations identified at block 203 and at block 207 must be identified in a manner so as not to violate these two rules. For another example, assume that the player's result correlates to "flush" as in the example shown in FIG. 4. In this case, since the "flush" result may be produced from the second set of card representations regardless of which two-card subset the player selects from the first set of card representations, the first set of card representations may be identified at random or in predetermined groups, or in any other suitable fashion. Also, the step of identifying card representations as indicated at block 207 will include making sure that the identified second set of card representations will produce a five card "flush" when combined with the player's selected subset 306, and no higher valued hand. Thus, the identification process at block 207 may include evaluating the subset that the player has selected and then producing the second set of card representations to ensure that the highest five card hand produced from the subset and the second set comprises a "flush," that is, five cards of the same suit.

As indicated in the above examples, each result that may be used as a result for the player in a video poker game according to the present invention may be associated with a series of rules that are used in identifying the card representations to be displayed as the first set of card representations and second set of card representations. Some preferred forms of the invention may include one or more databases correlating each potential result for a player with the card representation identification rules and also any prize associated with the result. For example, a result from a lottery-type game, bingo-type game, or a random result generator, may be identified as a result level, level "0" for example, and this result level may be correlated to both a prize level/value, no prize for example, and one or more rules to ensure that the graphic displayed according to process blocks 204 and 208 in FIG. 2 will be consistent with the result. The rules may be read from the database and applied by the component responsible for identifying and distributing card representations, distribution controller 113 for example, to ensure that card representations are identified to be consistent with the result level. The prize value information from the database may be used to award the prize as indicated at process block 210 in FIG. 2. Alternatively to applying rules to identify card representations "on the fly" at process blocks 203 and 207 in FIG. 2, each potential result may be pre-associated with a number of different displays of card representations that may be used to display the player's result. In these forms of the invention, the process of identifying card representations at blocks 203 and 207 in FIG. 2 includes selecting one of the pre-associated or "canned" display scenarios.

It will be noted that regardless of how the results are determined for the player, the subsets of the first set of card representations that are not selected by the player may be shown to have any result. This result may be greater than the result for the player or less than the result for the player. In FIG. 4 for example, all of the results that appear to be associated with the unselected subsets, subsets 302, 310, 314, and 318, are of lesser value than the result depicted for the player's selected subset, subset 306. However, since the values associated with the unselected subsets have no bearing upon the player's result, the results could have indicated a higher value, such as "four-of-a-kind."

In some forms of the invention, the result for a given play may be a single result from a lottery-type game or bingo-type game, or other game, and this result is ultimately awarded to the player regardless of the selection they make at process block 206 in FIG. 2. However, even where the result for a player is taken from a lottery-type game, bingo-type game, or some random result generating arrangement, it is possible within the scope of the present invention to allow the player's selection to affect their result. Where results are taken from a lottery-type game for example, each subset from the first set of card representations may be associated with a different lottery result, that is, a different electronic lottery ticket, either from the same lottery pool or from different lottery pools. The player's selection of a subset in this arrangement has the effect of selecting a particular result from among other available results associated with the other subsets. Of course, since the result will ultimately be represented by a five card hand and less than five cards are included in each subset that may be selected by a player, the subsets themselves preferably do not indicate the associated result. Also, the results displayed for the unselected subsets may or may not comprise the actual results with which each subset is associated.

Where the results are taken from a bingo-type game, each subset that may be selected by the player may be associated with a different bingo card. In this case the result for the player is dependent upon the result produced for the bingo card effectively selected by the player when they select their subset of card representations from the first set of card representations. In this arrangement, since the player's actual result will ultimately be represented by a five card hand, and since less than five cards are included in each subset that may be selected by a player, the subsets themselves preferably do not indicate the result for the bingo card associated with the respective subsets. In some forms of the invention in which each subset of card representations is associated with a respective bingo card, the result for a given bingo card may not be known to the system at the time of the player makes their selection of subsets at process block 206.

Another variation within the scope of the present invention involves the player selection step shown at block 206 in FIG. 2. Some forms of the present invention may allow the player to select two or more card representation subsets. This selection of multiple card representation subsets may be accomplished with a single input at block 206 or with multiple discrete inputs. Where the player selects multiple card representation subsets, that is, a first card representation subset and at least one additional card representation subset, the result for the player may comprise a single result or multiple results. For example, where the results in the gaming system are taken from a lottery-type game, a single lottery-type game result may be used to dictate the result to be represented by all of the player's selected subsets when individually combined with the second card representation set. Continuing with this example, assume a player selects two card representation subsets at block 206 in FIG. 2. For this play in the game, also assume a single result is taken from a lottery-type game, and that result includes a payout of ten credits. In this situation the optimum hand values for the combination of the first selected card representation subset and the second set of card representations and the combination of the second selected card representation subset and the second set of card representations will be controlled to be consistent with the win of ten credits. Either combination might have a value of ten credits with the other combination have a value of no credits, or both combinations may have a value of some credits totaling to ten.

In other forms of the invention, the player may be allowed to select multiple card representation subsets at block 206 in FIG. 2, and a different result will be obtained for each selection. In the lottery-type game driven versions of the present invention, the different results may be obtained by selecting multiple different lottery results from one or more pools of lottery records. For example, where a player selects two different card representation subsets, a first lottery result may be associated with one of the selected card representation subsets and a second lottery result may be associated with the other selected card representation subset. In this case, the second set of card representations may be selected so that the combination of the first selected card representation subset and the second set of card representations is consistent with one lottery result and so that the combination of the second selected card representation subset and the second set of card representations is consistent with the other lottery result. Alternatively, the second set of card representations may be controlled so that the two combinations are consistent only with the total of the two lottery results. That is, even if the results for the two player-selected card representation subsets in our example are taken from two lottery game results, the resulting hands produced when combined with the second set of card representations need not correlate to the two lottery results in some implementations of the invention. For a specific example of this implementation, assume a player selects two card representation subsets and that two lottery results are selected, one having a payout of ten credits and one having a payout of five credits. In this case the second set of card representations may be selected such that one hand produced by combining one of the selected card representation subsets with the second set of card representations correlates to a payout of fifteen credits, that is, the total of the two lottery results, while the other card hand correlates to a payout of no credits. Allowing the combined hands to correlate to payouts that total to the lottery result total provides greater flexibility in selecting the cards to be included in the second set of card representations.

Corresponding options are available in the invention where the results are taken from a bingo-type game. That is, one or more bingo-type game results may be represented by combinations made by multiple selected card representation subsets with the second set of card representations, or each selected card representation subset may be associated with a separate bingo-type game result.

In implementations of the invention in which a player may select two or more of the card representation subsets displayed as indicated at process block 204 in FIG. 2, the player selection may be handled in several different fashions within the scope of the invention. In one preferred form of the invention, the player is required to select the number of card representation subsets he or she wishes to play prior to revealing the card faces for the various card representation subsets. This selection of the number of card representation subsets that are to be played may be part of the input received at process block 202 in FIG. 2. The player may then be allowed to select the specific card representation subsets as the input at process block 206 in FIG. 2. However, other forms of the invention may allow the player to select the number of card representation subsets that are to be played after the player sees the face of one or more card representations included in each card representation subset.

It will also be noted that the number of card representation subsets selected for play in a given instance of the game cycle shown in FIG. 2 may affect the player's odds of winning in the game. For example, the player's odds of winning may be reduced as the player selects more card representation subsets to play in a given cycle. In this case, different pay tables may be applied based on the number of card representation subsets that are selected for play by the player in a give cycle of the game. The different pay tables account for the different odds resulting from the player's selection of multiple card representation subsets for play in the game.

The above-described preferred embodiments are intended to illustrate the principles of the invention, but not to limit the scope of the invention. Various other embodiments and modifications to these preferred embodiments may be made by those skilled in the art without departing from the scope of the invention.

The invention claimed is:

1. A method including:

(a) displaying a first set of card representations at a player station display device, the first set of card representations being organized into a number of card representation subsets, each containing two or more card representations comprising a respective individual starting hand mutually exclusive to the other subsets, and being displayed as visually grouped together but visually divided from the other subsets;

(b) receiving an input from a player to select first and second ones of the number of subsets from the first set of card representations;

(c) identifying a first and second result for the player based on one or more bingo game outcomes or predetermined outcome records; and (d) displaying a second set of card representations at the player station display device to combine with the first selected subset of the first set of card representations to produce an optimum poker hand consistent with the first result identified for the player, and to combine the second set of card representations with the second selected subset, being played as an additional starting hand, to produce a second optimum poker hand consistent with the second result identified for the player.

2. The method of claim 1 further including associating a different electronic lottery ticket with each respective card representation subset.

3. The method of claim 1 further including associating a different bingo card representation with each respective card representation subset.

4. The method of claim 1 further including displaying a label proximate each of the number of card representation subsets after displaying the second set of card representations, the respective labels indicating an optimum value for the respective combination of card representation subset and the second set of card representations.

5. The method of claim 1 in which identifying the result for the player is based on a bingo result obtained from a bingo-type game played by grouping multiple players' game play requests at a gaming server after receiving the input to select the subsets.

6. A system including:

(a) a first player station having a display device; and (b) a distribution controller for identifying and distributing to the first player station a first set of card representations to be displayed on the display device, the first set of card representations being organized into a number of card representation subsets, each containing two or more card representations comprising a respective individual starting hand mutually exclusive to the other subsets, and being displayed as visually grouped together but visually divided from the other subsets on the display device, the distribution controller also for identifying at least a first and a second result for the player based on one or more bingo game outcomes or predetermined outcome records, the distribution controller also for identifying and distributing to the first player station a second set of card representations after a player selects at least a first and a second respective ones of the card representation subsets from the first set of card representations, the second set of card representations combining with the first card representation subset selected by the player to produce a first optimum poker hand consistent with the first result identified for the player, the second set of card representations also combining with the second card representation subset selected by the player to produce a second optimum poker hand consistent with the second result identified for the player.

7. The system of claim 6 further including a combination controller for combining the second set of card representations with each subset of the number of card representation subsets that were not selected by the player.

8. The system of claim 6 further including a prize controller to direct the display device to display a label proximate each of the number of card representation subsets, the respective labels indicating an optimum value for the respective combination of card representation subset and the second set of card representations.

9. The system of claim 8 wherein the prize controller is configured to assign at least one prize to the player consistent with the first or second result identified for the player.

10. A program product stored on at least one storage medium, the program product including a set of machine-readable instructions that when executed are configured to:

(a) display a first set of card representations at a player station display device, the first set of card representations being organized into a number of card representation subsets, each containing two or more card representations comprising a respective individual starting hand mutually exclusive to the other subsets and being displayed as visually grouped together but visually divided from the other subsets;

(b) receive an input from a player to select first and second ones of the number of subsets from the first set of card representations;

(c) identify a first and second result for the player based on one or more bingo game outcomes or predetermined outcome records; and (d) display a second set of card representations at the player station display device to combine with the first selected subset of the first set of card representations to produce an optimum poker hand consistent with the first result identified for the player, and to combine the second set of card representations with the second selected subset, being played as an additional starting hand, to produce a second optimum poker hand consistent with the second result identified for the player.

11. The program product of claim 10 wherein the set of machine-readable instructions that when executed are configured to display the first set of card representations further includes machine-readable instructions that when executed are configured to associate a different electronic lottery ticket with each subset of card representations.

12. The program product of claim 10 wherein the set of machine-readable instructions that when executed are configured to display the first set of card representations further includes machine-readable instructions that when executed are configured to associate a different bingo card representation with each subset of card representations.

* * * * *